No. 664,186. Patented Dec. 18, 1900.
C. STROBEL.
COOLER.
(Application filed Aug. 10, 1900.)
(No Model.) 2 Sheets—Sheet 1.
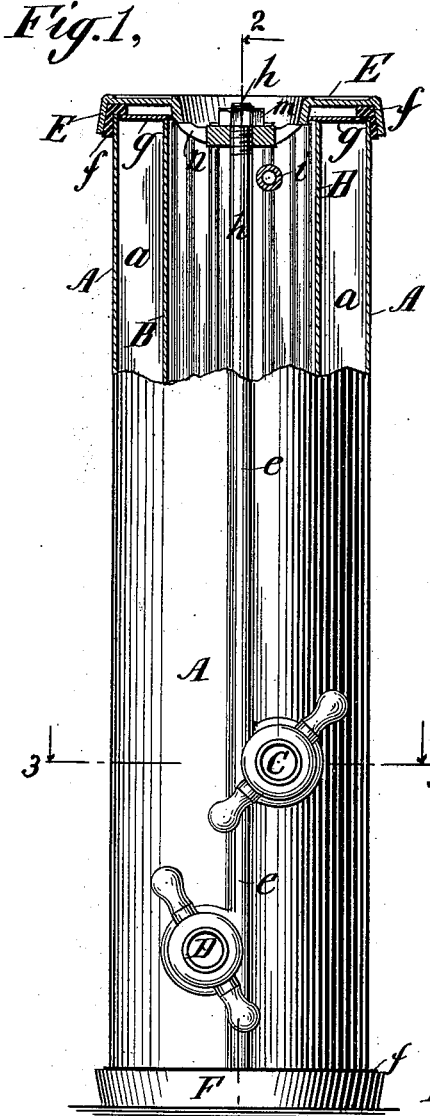
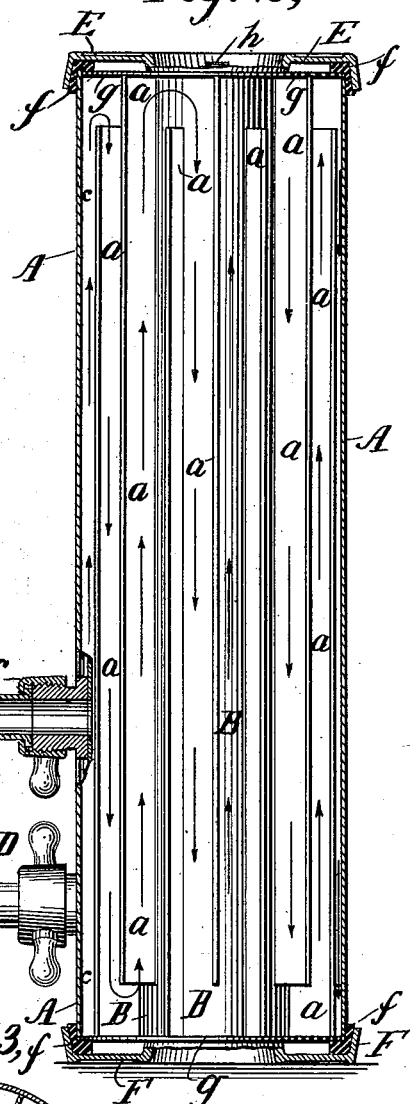
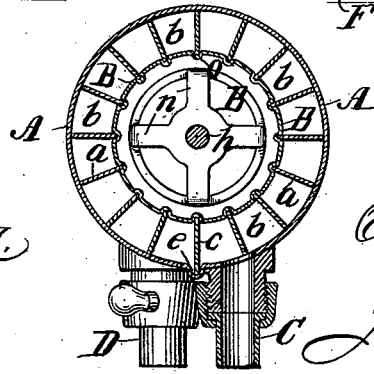
WITNESSES:
INVENTOR
Christian Strobel
BY
J. N. McIntire
ATTORNEY No. 664,186. Patented Dec. 18, 1900.
C. STROBEL.
COOLER.
(Application filed Aug. 10, 1900.)
(No Model.) 2 Sheets—Sheet 2.
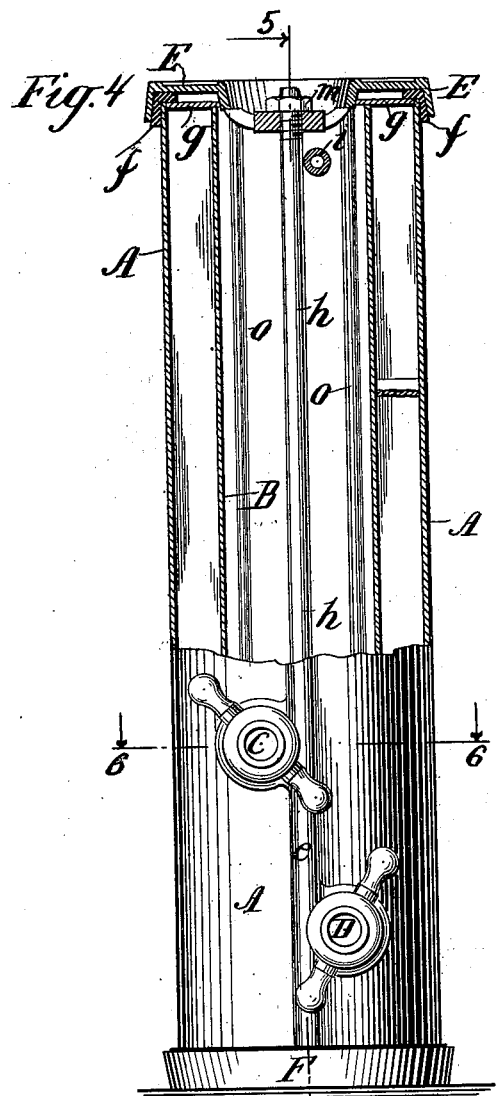
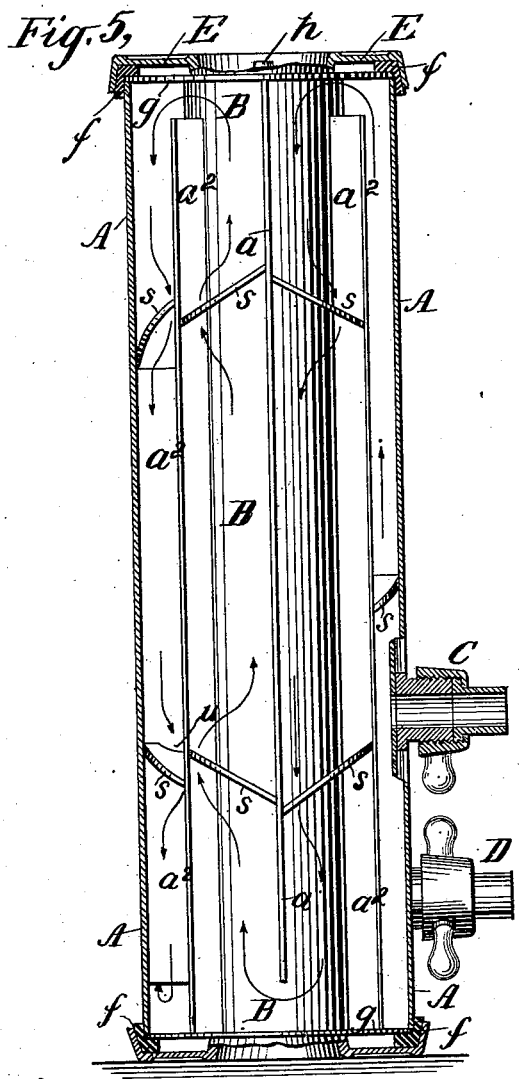
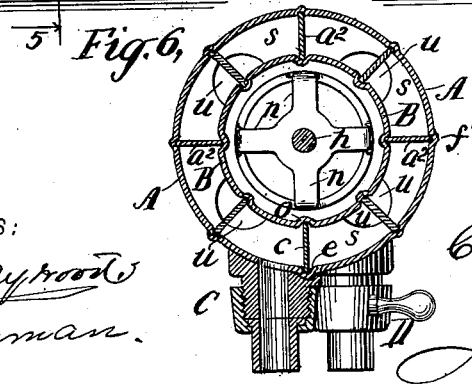
WITNESSES:
INVENTOR
Christian Strobel
BY
ATTORNEY

UNITED STATES PATENT OFFICE.

CHRISTAIN STROBEL, OF WATERBURY, CONNECTICUT.

COOLER.

SPECIFICATION forming part of Letters Patent No. 664,186, dated December 18, 1900.

Application filed August 10, 1900. Serial No. 26,469. (No model.)

*To all whom it may concern:*

Be it known that I, CHRISTAIN STROBEL, a citizen of the United States, residing at Waterbury, in the county of New Haven and State of Connecticut, have invented certain new and useful Improvements in Coolers for Beer or other Beverages; and I do hereby declare the following to be a full, clear, and exact description thereof, reference being had to the accompanying drawings, which form part of this specification.

My invention relates to that type of coolers for beer and other beverages in the use of which the liquid to be cooled is forced therethrough under pressure from the keg or other receptacle in which the beverage is supplied to the saloon or café proprietor. Previous to my invention various constructions of coolers of this type have been devised and used, many of which have been patented; but in all of the devices or contrivances so far devised to my knowledge some defects or objections of a serious nature have been found in practice to exist, and no one of such prior devices has, I believe, given good satisfaction to the barkeeper and user thereof. Some of the prior devices have been inefficient in practical operation on account of a liability to soon get clogged up, or by reason of causing the liquid in the case of beer to be discharged at the bar-faucet in a too-frothy (or churned up) condition, or because of incapacity to sufficiently chill or cool the liquid passed through when the latter might be rapidly or frequently tapped at the bar-faucet, or on account of all of these and other inherent defects of operation. Others have been found to be objectionable in practice by reason of requiring too much time and trouble to keep them sweet and clean or on account of complexity of construction and liability to get out of working order, while some, though not satisfactorily efficient, have been too costly of manufacture.

I propose by my invention to supply for use in saloons, cafés, and other places a cooler which while exceedingly simple of construction and economic of manufacture will work perfectly, can be quickly and easily cleaned at pleasure, will thoroughly chill or cool a maximum amount of the liquid drawn through it, and will, especially in the case of cooling lager-beer, cause the beer to come from the bar-faucet in just the desired condition.

To these main ends and objects my invention may be said to consist, primarily, in a cooler composed of an outer cylinder, an inner cylinder formed or provided with a series of radially-arranged partition-like plates and annular end pieces, a pair of heads, and means for securing together said parts when properly assembled and permitting their separation from each other, all as will be hereinafter presently explained and as will be most particularly pointed out in this specification, and, secondarily, in the certain specific structural features which will also be found hereinafter described, and also most particularly pointed out in the claims of this specification.

To enable those skilled in the art to which my invention relates to fully understand and practice the latter, I will now proceed to more fully describe my improvements, referring by letters to the accompanying drawings, which form part of this specification, and in which I have shown my invention carried out in those precise forms in which I have so far successfully and extensively practiced it.

In the drawings, Figure 1 is an elevation of one of my improved coolers with the upper portion, however, in vertical central section. Fig. 2 is a vertical central section of the same on the line 2 2 with the inner cylinder and its attached longitudinal plates and annular end pieces, however, drawn in elevation. Fig. 3 is a horizontal or cross section taken in a plane indicated by the dotted line 3 3 at Fig. 1. Fig. 4 is a view similar to Fig. 1, but with about the upper half of the cooler in vertical central section and showing a somewhat-different arrangement of interior devices from that employed in the device shown in the three preceding figures. Fig. 5 is a vertical central section on the line 5 5 of the cooler seen at Fig. 4, but with the inner cylinder and its attachments drawn in elevation. Fig. 6 is a horizontal section in a plane indicated by the line 6 6 at Fig. 4, but showing a modification of the cooler seen at Figs. 4 and 5 that will be presently described.

In the several figures the same part will be found always designated by the same letter of reference.

Referring now to Figs. 1, 2, and 3, A is a metallic hollow cylinder or tube open at both ends and preferably provided with two pipe nozzles and couplers C and D, one for connecting said cylinder with the pipe leading to the source of supply of the liquid to be cooled and the other for connecting it to the bar-faucet. Arranged concentrically within said cylinder A is another metallic tube or open-ended cylinder B, nearly equal in length to A and formed or provided at each end with an annular plate $g$, the central opening of which is of about the same size as the bore of tube B and the extreme diameter of which is such that it just fits snugly at its periphery within the bore of the outer cylinder A (see particularly Fig. 2) when the two cylinders are secured together. Said inner cylinder or tube B is also formed or provided with a series of radially-arranged partition-like plates $c$ and $a$, that one of which lettered $c$ extending from end to end of the cylinder, abutting at its ends against the inner surface of the two annular plate-like parts $g\ g$, while all the others (marked $a$) extend from the inner surface of one of the end rings $g$ to within a short distance of the other, the arrangement of said partition-like devices $a$ being such that the open spaces between their ends and said rings $g$ are alternately at opposite ends of the cooler, as shown.

E and F are two similarly-made "cylinder-heads," so to speak, preferably of cast metal, the peripheral flange-like portions of which are preferably made flaring, as shown, so that when said heads are applied to the opposite ends of the assembled cylinders A and B, as seen in the drawings, and forcibly held in place against them they will confine between them and said cylinder end rubber gaskets or packing-rings $f$, made, preferably, as shown. Each of said devices E and F is formed with a sort of spider-like central portion $n$, in the middle of which is a small aperture for the accommodation of a tie-rod $h$, which passes therethrough, and with four (more or less) larger apertures communicating with the interior or bore of the inner cylinder B, and when the parts are all assembled, as shown at Figs. 1 and 2, the application to each threaded end of the tie-rod $h$ of a nut $m$ and the turning home of said nuts effectuates the securement together of the parts of the cooler, with the joint between the perimeter of each annular end piece $g$ of the inner cylinder and each end portion of the outer cylinder A perfectly packed liquid-tight by one of the packing-rings $f$.

The outer cylinder A is made with a longitudinal crimp at $e$, which produces a straight recess or groove on the internal surface of the cylinder, and this corrugation in the metal to produce said internal groove is purposely located intermediately of the inlet and outlet apertures of the cylinder, that communicate, respectively, with the coupler-nozzles D and C.

In assembling the parts of the cooler the relative arrangement of the two cylinders must be such circumferentially that the continuous partition-plate $c$ will engage at its outer edge with the groove at $e$, as most clearly shown at Fig. 3, and the lower end of the inner cylinder, with its radial partition-plates $a$ and end rings $g$, having been thus inserted within the upper end of the inner cylinder A the former may be forced down without the latter into the normal relative position seen in the drawings.

Preferably in making the inner member of the cooler I form the inner metal tube B with a series of equidistant longitudinal exterior grooves or corrugations $o$, (see Fig. 3,) in which are located and securely soldered or brazed the inner edges or roots of the radial partition-plates $c$ and $a$; but of course some other detail construction may be adopted as to this part of the general construction if found expedient.

Each of the end pieces $g$ of the inner cylinder I have so far in the manufacture of my improved cooler securely soldered at its inner face to the end of the cylinder and also to the flush ends of all the partition-plates $c$ and $a$; but these parts may be otherwise united, and, in fact, if found practicable and desirable the said inner cylinder and its radial plates and its annular parts $g$ may be made integral. In any case, however, each plate $g$ should be formed with a small teat-shaped radial projection at the proper point in its periphery to cover over one of the open ends of the groove or corrugation $e$ of the outer cylinder A, and each rubber gasket $f$ is formed with a projection at one point in the periphery of its vertical rim that in like manner fits around one end portion of the corrugation $e$ and its adjacent ring-teat $g$, in order that the assembled parts may be packed liquid-tight at these localities.

In assembling the parts of the cooler the outer cylinder A and lower head F, together with the lower gasket and the tie-rod $h$, with the nut on its lower end, may first be put together, the inner cylinder and its permanently-attached parts placed in position, and finally the upper head E, with its gasket, applied and the parts all clamped securely together by the application of the upper nut $m$ to the tie-rod.

It will be understood that with the parts assembled and the nozzles C and D properly connected with the pipes leading, respectively, to the bar-faucet and the beer-keg, for instance, in the cellar the cooler is located or stands on its bottom within the work-table of the bar (where the ordinary coils and other kinds of coolers are usually placed) and that in this condition the beer forced up to and through the cooler by the usual pressure applied to the liquid in the supply-receptacle, entering the latter near the lower end at one side of the continuous partition-plate C, will travel thence upwardly between the latter and one of the plates $a$, over the top of which it will pass, descending thence between said plate $a$ and the next plate $a$, beneath the lower end of which it will travel, thence ascending between said plate and the next one, and so on, until having passed alternately up and down between the plates $a$ it will get to the lower portion of the space on the opposite side of plate $c$, where it entered, whence it can flow out through the outlet-nozzle $c$ in the pipe leading to the bar or drawing faucet, and it will be seen that in view of the extent or degree of circulation of the beer through the cooler and the quantity contained therein the beer will always be thoroughly chilled by the ice packed around the outer cylinder and the ice-water which fills in the space interior of the inner cylinder or other cooling medium employed.

Whenever it may be desirable to clean out the cooler, it is only necessary to disconnect or shut off the supply of beer, then unscrew the top nut $m$, remove the upper head E, and then pull upward and out the inner cylinder and its permanently-attached parts, when the plain outer cylinder can be washed or flushed out and the inner removed cylinder thoroughly and easily cleaned, since the latter device is of such construction that all its circulative passages are widely open and fully exposed to be brushed out and otherwise cleaned. To facilitate the ready withdrawal thus of the inner cylinder, I provide the latter near its upper end with an interiorly-arranged hand-bar $i$, (see Fig. 1,) made, preferably, of a piece of small metal tubing soldered in sufficiently to one side of the diameter of the cylinder to be clear of the tie-rod $h$ and at the same time permit the fingers of a person to conveniently get hold of it.

It will be seen that my improved cooler is composed, essentially, of only two parts, (the plain outer and the inner cylinders,) besides the cast heads E and F and the clamping tie-rods, and that in practice to detach, easily clean out, and reattach all the parts only one part practically has to be detached—viz., the inner cylinder B.

The proportions of the parts and the size of the whole cooler are not essential to my invention, though in practicing the latter I have found the proportions shown to be desirable and productive of perfect results, and I have made and am manufacturing the cooler for general use with the outer cylinder A about four inches in diameter and about fifteen inches long.

Where a plant is fitted up with all the beverages to be sold drawn through a series of my coolers, the precise construction shown at Figs. 1, 2, and 3 and so far described works perfectly; but the liquids are so much more easily forced properly through the cooler than through the ordinary pipe-coil coolers generally in use that very much less pressure is required.

I have found by actual practice that in lieu of a pressure of, say, about twenty-five pounds (requisite for the ordinary coil-coolers of bars) about fourteen or fifteen pounds is requisite for and necessary to the proper making of my cooler, and from this fact it follows that in cases in which a purchaser may desire to use one or more of my improved coolers in a plant comprising also some pipe coil coolers it is necessary for him to have applied a separate additional check-valve to the pressure apparatus, so as to reduce the pressure supplied to that one or more of the beverage-receptacles from which may be supplied the liquid designed to pass through some one or more of my coolers. To meet this emergency and to avoid to the purchaser the expense of adding such extra check-valve to his plant, I have devised and successfully used the modification of my invention shown at Figs. 4, 5, and 6 of the drawings, which shows the inner cylinder provided with only half the number of longitudinal wing-plates $a^2$ and provided with a series of cross plates or partitions $s$, that are arranged preferably as shown and each of which is perforated or cut out, as shown at $u$, (see Fig. 6,) to permit the ascending and descending columns of beer to flow therethrough. By this modified construction, in which a much wider circulating-space is created between the longitudinal partition-plates $a^2$, but the passage of the beer in being drawn off retarded or obstructed by the presence of the cross-partitions $s$, I have found by actual practice that my improved cooler may be used with about the same pressure approximately employed in connection with the ordinary coil-coolers—say about twenty-five pounds—and the beer will be forced through the cooler in just the proper or desirable manner and discharged at the bar-faucet in substantially the same manner as in the case of the use of the cooler made as shown at Figs. 1, 2, and 3.

At Fig. 6 I have illustrated a still further modification, but merely in the detail construction of the device, to render it better, but without, however, perceptibly changing its operation. This modification consists in making or drawing the outer tube A with a series of longitudinal corrugations $f'$, productive of a series of grooves in the bore of the cylinder equal in number to the number of partition-plates $a^2$, and in making the radially-arranged plates wider, so that their outer edges fit and slide (in detaching and reattaching the two cylinders) within said grooves in substantially the fashion in which the continuous plate $c$ fits and works within the groove $e$, Figs. 3 and 6. When thus made, it may be desirable to have each annular end plate $g$ formed with a series of radially-projecting teats at its periphery to cover over the ends of all the grooves $f$, the same as I have explained the end of the groove $e$ to be covered, and to have the rubber packing-rings of each made correspondingly.

What I claim as new, and desire to secure by Letters Patent, is—

1. A cooler composed of an outer cylinder or tube; an inner cylinder formed, or provided, with a series of radially-projecting partition-plates extending alternately from one end to within a suitable distance of the other, annular end plates, and one partition-plate running the whole length of said cylinder; suitable heads, or plates, between which the two cylinders are confined endwise and operating to also close, liquid-tight, the ends of the liquid-circulation spaces; means for detachably securing the aforesaid parts together; and means for permitting the entrance of the liquid to be cooled into the circulation-space at one side of the said continuous partition-plate and its exit from said space at the opposite side of said continuous partition; all substantially as and for the purposes hereinbefore set forth.

2. In a liquid-cooler of the type shown and described, the combination with the outer cylinder; the inner cylinder formed, or provided, with a series of radially-arranged, longitudinal plates and with annular end plates; suitable heads; and inlet and outlet devices, as specified, of a series of cross-partitions in the longitudinal circulation-passages arranged substantially as shown and described and having apertures in them; the whole constructed and operating substantially as and for the purposes set forth.

In witness whereof I have hereunto set my hand this 7th day of August, 1900.

CHRISTAIN STROBEL.

In presence of—
 M. O'NEILL,
 M. J. BYRNE.